United States Patent [19]
Sauve

[11] Patent Number: 5,522,128
[45] Date of Patent: Jun. 4, 1996

[54] APPARATUS FOR CENTERING AND ALIGNING SEMI-RIGID MATERIALS, SUCH AS AN AUTOMOTIVE HEADLINER, FOR MOUNTING A LOCATING FEATURE THEREON

[75] Inventor: Paul J. Sauve, Warren, Mich.

[73] Assignee: Chrysler Corporation, Auburn Hills, Mich.

[21] Appl. No.: 324,302

[22] Filed: Oct. 17, 1994

[51] Int. Cl.⁶ .................................................. B23P 21/00
[52] U.S. Cl. ............................. 29/709; 29/281.4; 269/227
[58] Field of Search ........................... 29/407, 709, 281.1, 29/281.4, 705, 406; 269/227, 218

[56] References Cited

U.S. PATENT DOCUMENTS

| 909,469 | 10/1908 | Solberg | 269/227 |
|---|---|---|---|
| 2,676,659 | 12/1949 | Emmer | 269/227 |
| 2,904,087 | 9/1959 | Walthall | 269/227 X |
| 4,129,914 | 12/1978 | Jahn | 29/281.4 X |
| 4,561,176 | 12/1985 | Leddet | 29/709 |
| 5,186,517 | 2/1993 | Gilmore et al. | 296/214 |

Primary Examiner—Peter Vo
Assistant Examiner—Khan V. Nguyen
Attorney, Agent, or Firm—Margaret A. Dobrowitsky

[57] ABSTRACT

A method and apparatus for centering and aligning a semi-rigid material, preferably a vehicle headliner, relative to a centering apparatus, is disclosed for mounting thereon a locating feature about the actual center line of the headliner. The method and apparatus is also suitable for use with an automotive backwall, shelf panel or carpeting. The apparatus includes a support, a centering device comprising a rack and pinion assembly driven by a low air pressure drive means, a sensor including a limit switch or the like to detect when the headliner is aligned relative to the apparatus, and a hinged arm and nest assembly for placing the locating feature on the vehicle headliner. The nest, which is attached to the hinged arm, is sized to receive the locating feature, and the arm is connected to a bearing adapted to rotate in a plane containing the apparatus axis so that when the hinged arm and nest assembly is pivoted about the bearing, after the headliner has been centered, the locating feature is accurately placed and mounted on the workpiece about the workpiece center line.

5 Claims, 1 Drawing Sheet

U.S. Patent
Jun. 4, 1996
5,522,128
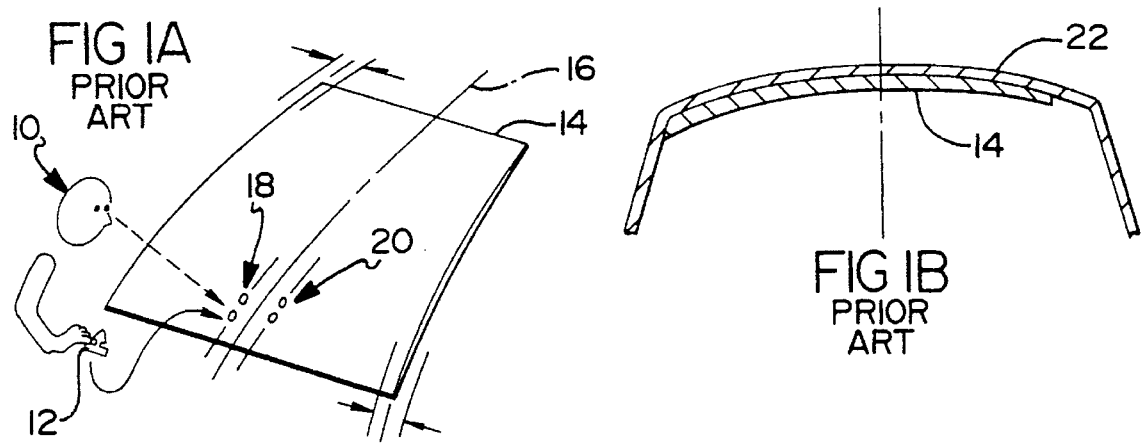
FIG IA PRIOR ART
FIG IB PRIOR ART
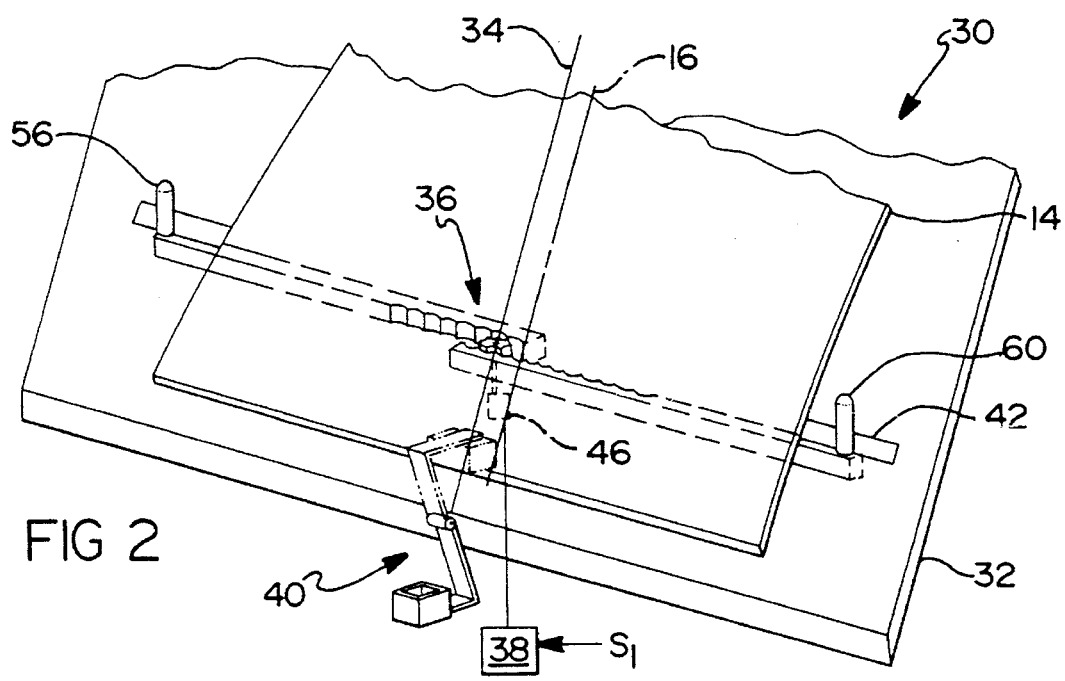
FIG 2
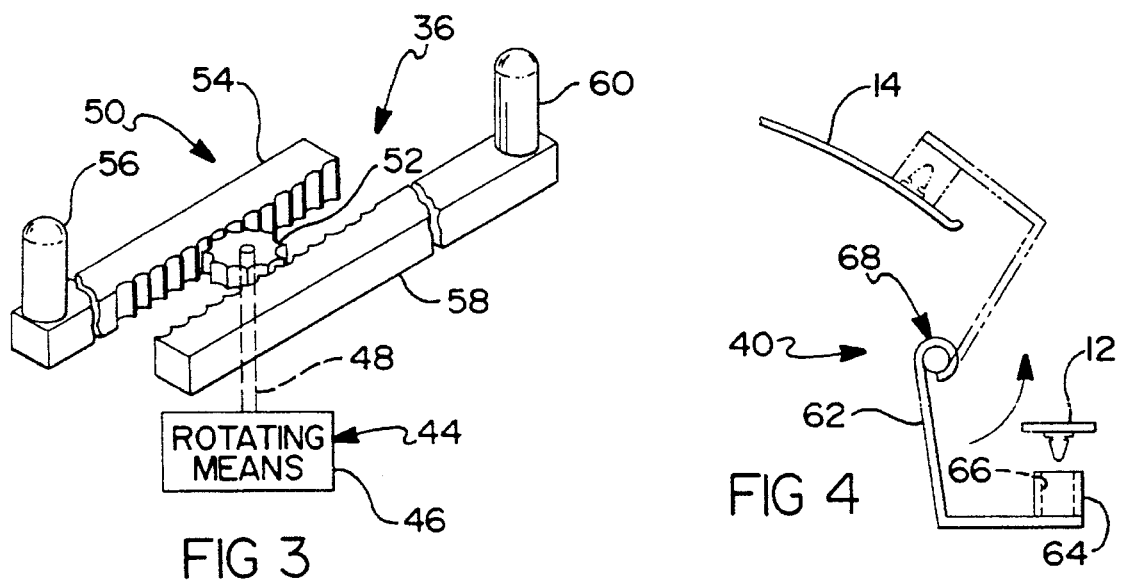
FIG 3
FIG 4

APPARATUS FOR CENTERING AND ALIGNING SEMI-RIGID MATERIALS, SUCH AS AN AUTOMOTIVE HEADLINER, FOR MOUNTING A LOCATING FEATURE THEREON

TECHNICAL FIELD

This invention relates to a method and apparatus for centering semi-rigid materials, and in particular, to a method and apparatus for centering an automotive headliner for mounting of a locating feature thereon.

BACKGROUND OF THE INVENTION

So-called "soft trim" materials or components are indispensable in furnishing a motor vehicle interior that meets today's demands of a sophisticated market place. For example, automotive headliners, carpet materials, and shelf trim panels are almost universally employed to satisfy such demand. The characteristic of such semi-rigid components (i.e., propensity to bend or shred rather than be cut cleanly) introduces limitations as to how exacting dimensional tolerance requirements may be specified, regardless of the trimming method used (e.g., by use of mechanical blades or by water jets).

One application where the above-mentioned tolerance limitations are especially critical is the trimming of an automotive headliner and the mounting of a locating feature on the trimmed headliner for centered installation in an automobile. To illustrate, and referring now to FIG. 1A, a prior art centering process involves an operator 10, a locating feature 12, and a trimmed headliner 14 having longitudinal axisor center line 16. One way to center the headliner 14 on the underside of an automobile roof is to affix locating feature 12 (e.g., a pin, clip, or the like) to the backside of headliner 14, which locating feature is adapted to be received in corresponding holes, grooves, or the like formed in the steel roof of the automobile. The prior art process involved punching holes onto the theoretical center line (i.e., the center line prior to the trimming operation) of the headliner 14. However, due to the limitations on the accuracy of the trimming operations, the actual center line of the trimmed panel may be to the left or to the right of where the holes were punched. For example, punched holes 18 may result when too much material is trimmed off the left side of headliner 14 and too little trimmed off the right side, while punched holes 20 result when too little is trimmed off the left side and too much off the right side. To further exacerbate this problem, the process of forming the holes is also inherently limited by the materials involved. This imprecision adds to the cumulative process tolerance regarding the location of the locating feature. The operator 10 must then visually locate the holes, which are difficult to see due to their small size and headliner 14 construction. The operator 10 then manually positions and glues locating device 12 into the holes. The result is that the final assembled headliner 14 is quite often unacceptable in terms of centering once installed into a vehicle because the theoretical center line, about which the holes are punched, and which are used in locating and mounting the locating device 12, is not maintained relative to the trimmed edges of headliner 14. As shown in FIG. 1B, the result of installing such a headliner 14 to the underside of an automobile roof 22 is, at a minimum, poor appearance, and which may require costly re-work.

Accordingly, there is a need to provide an improved method and apparatus for centering and aligning semi-rigid materials, such as an automotive headliner, for mounting a locating device thereon.

SUMMARY OF THE INVENTION

The apparatus of the present defines a fixture for mounting a locating feature on a semi-rigid workpiece wherein the fixture includes a longitudinal axis and wherein the workpiece includes a center line. The fixture comprises a support adapted to receive the workpiece. A centering device proximate the support and having a pair of movable centering members adapted to move toward or away from each other such that each centering member maintains an equal distance from the fixture axis is included to engage the workpiece with at least one of the centering members to thereby move the workpiece in a direction tending to align the actual center line of the workpiece with the fixture axis. The invention further includes a sensor for detecting when the workpiece center line is substantially aligned with the fixture axis; when this condition is detected, the sensor is operative to cause the centering device to discontinue motion of the centering members. Finally, the apparatus includes a locator placement means for placing the locating feature onto the workpiece in a location about the actual center line of the workpiece.

In a preferred embodiment, a centering device is constructed using a pair of toothed racks in mesh with a tooth pinion wherein rotation of the pinion causes each rack to move an equal amount. Extending from each rack is a respective centering member which extends above the workpiece support. Driving the pinion is a low air pressure powered motor. The sensor is constructed using at least one limit switch to detect when the workpiece abuts one of the centering members, the limit switch being operative, upon detecting the abutment, to cause the centering device to discontinue motion of the centering members (i.e., by interrupting the drive supplied from the air powered motor). Important to the high accuracy of the fixture is the hinged locator arm and nest assembly used for placing the locating feature onto the workpiece in a location about the workpiece center line. The locator arm pivots in a plane containing the fixture axis. The locator arm includes a nest having a recess sized to receive the locating feature. Thus, after the actual center line of the workpiece is substantially aligned with the fixture axis, the hinged locator arm pivots along the fixture axis to mount the locating feature onto the workpiece in a location about the center line. The accuracy of the placement is essentially limited only by the precision of the bearing on which the locator arm pivots.

In accordance with a second aspect of the present invention, a method is provided for centering a locating feature on a semi-rigid workpiece using a fixture having a longitudinal axis, and a support adapted to receive the workpiece. The method comprises the steps of: (a) placing the workpiece on the support between a pair of centering members; (b) moving the centering members toward each other such that each centering member maintains an equal distance from the axis; (c) discontinuing the motion of the centering members when the actual center line of the workpiece is substantially aligned with the fixture axis and, (d) moving the locating feature in a plane containing the fixture axis onto the workpiece to thereby mount the locating feature about the center line of the workpiece.

BRIEF DESCRIPTION OF THE DRAWINGS

FIG. 1A is a perspective view of a prior art headliner, including a locating feature, made by a prior art process of centering and mounting the locating feature.

FIG. 1B is a section view of the headliner made in accordance with the prior art process shown in FIG. 1A installed and mounted to the underside of an automobile roof, including an exaggerated depiction of the headliner being installed off-center.

FIG. 2 is a perspective, partial view of a fixture made in accordance with the present invention for centering semi-rigid workpieces and mounting thereon a locating feature about the actual center line of the centered workpiece, the fixture including a centering device and a locator placement apparatus.

FIG. 3 depicts in greater detail the centering device shown in FIG. 2.

FIG. 4 is a side view of the locator placement apparatus shown in FIG. 2 depicting a first loading position for loading a locating feature to be mounted on the workpiece, shown in solid line, and a second, mounting position, shown in phantom for placing the locating feature on the workpiece.

DESCRIPTION OF THE PREFERRED EMBODIMENTS

FIG. 2 is a perspective view of a centering and mounting fixture 30 made in accordance with the present invention. The fixture 30 includes a support 32, preferably in the form of a table, adapted to receive a semi-rigid workpiece, as for example headliner 14. Fixture 30 is also suitable for use with an automotive backwall panel, shelf panel, and carpeting. Fixture 30 includes a longitudinal axis 34, a centering device 36 proximate support 32 and being operative to engage workpiece 14 to thereby move the workpiece 14 in a direction tending to align the center line 16 with axis 34. The fixture 30 also includes a sensor or sensing means 38 for detecting when the center line 16 of workpiece 14 is substantially aligned with axis 34 and is operative to discontinue the motion of centering device 36. The fixture 30 also includes a locator placement apparatus or means 40 proximate support 32 and centering device 36 for placing a locating feature 12 onto workpiece 14 in a location coincident with center line 16. Locator placement means 40 is positioned for movement along axis 34.

The support 32 may include a groove or aperture 42 for allowing centering device 36 to engage workpiece 14. It should be understood, however, that there are a multitude of alternative designs to allow such engagement.

As shown in FIG. 3, centering device 36 includes a rotating means 44, which is preferably a low pressure, air operated motor 46. Alternatively, motor 46 may comprise a low pressure, hydraulically (fluid) operated motor. Air pressure motor 46 is operatively coupled by way of coupling shaft 48 to rack and pinion assembly 50. The rack and pinion assembly 50 is of conventional design, and includes a toothed gear or pinion 52, a first rack 54 having an elongated toothed portion in mesh with pinion 52 and further having a centering member or arm 56 extending therefrom. Rack and pinion assembly 50 further includes a second rack 58 having a corresponding elongated toothed portion in mesh with pinion 52 and further having a second centering member or arm 60 extending therefrom. Rotation of pinion 52 causes centering members 56, 60 to move toward or away from each other by an equal amount relative to the center line of the rack and pinion assembly 50. Rack and pinion assembly 50 is positioned relative to fixture 30 so that axis 34 is coincident with the center line of the rack and pinion assembly 50 so that as pinion 52 is rotated, centering members 56 and 60 maintain an equal distance from axis 34. It should be appreciated that any assembly that moves centering members 56, 60 equally, for example, a pulleys and cable arrangement, is suitable for my invention.

As shown in FIG. 2, the operation of fixture 30 involves placing workpiece 14 on support 32 between centering members 56 and 60. The centering members 56, 60 are then moved toward each other by operation of motor 46 to drive assembly 50. As centering members 56, 60 move toward each other, any "gap" existing between an outer edge of workpiece 14 and a respective centering member is reduced such that at least one of the centering members 56, 60 engage workpiece 14 to thereby move workpiece 14 in a direction tending to align center line 16 with axis 34.

Next, the motion of centering members 56, 60 is discontinued when center line 16 is substantially aligned with axis 34. This condition is detected by sensor 38 (via input $S_1$), which may include, for example, at least one limit switch positioned proximate to one of centering members 56, 60 to detect when the workpiece abuts the centering member. Input $S_1$ may thus comprise, for example, detection of workpiece 14 contacting one of the centering members, recognition of a "gap" (or lack thereof) between a centering member and workpiece 14. Alternatively, a pair of limit switches may be employed, one proximate each centering member 56, 60 to detect when respective edges of workpiece 14 abut both centering members 56, 60. As further alternatives, sensor 38 may include contact stops, a small ball-point probe (such as is used in connection with inspection devices to sense contact with, for example, a clay model, to determine spatial coordinates of surfaces thereof) or optical transmitters/receivers positioned to detect when the abovementioned "gaps" have been eliminated, wherein alignment of center line 16 and axis 34 has been achieved. Sensor 38, depending on the configuration employed and the state associated with components so used, may be operative to interrupt motor 46 to discontinue motion of centering members 56, 60. Alternatively, coupling 48 may be disengaged.

It should be appreciated by one of ordinary skill in the art that a multitude of sensing configurations as well as configurations to discontinue motion of centering members 56, 60 may be employed, including various provisions to account for the inertia of the moving parts of fixture 30 (i.e., to detect a predetermined "gap" between an edge of workpiece 14 and a respective centering member 56, 60 in order to account for the lag observed in discontinuing the motion of the centering members 56, 60).

Referring to FIG. 2, locator placement means 40 is shown, which, as mentioned above, functions to place the locating feature 12 onto workpiece 14 in the location about center line 16. As shown in FIG. 4, locator placement means 40 includes a locator arm 62, and further includes a nest 64 having a recess 66 sized to receive locating feature 12. The locator arm 62 is pivotally connected to bearing 68. Locator placement means 40 is positioned in fixture 30 so that locator arm 62 rotates or is movable in a plane containing fixture axis 34.

In operation, as shown in FIG. 4, locator placement means 40 has a first position, depicted in solid line, for loading nest 64 with locating feature 12. The locator placement means 40 further includes a second position, shown in phantom line, wherein locator arm 62 is moved or is pivoted about bearing 68 for placing the locating feature onto workpiece 14. Since the locator arm 62 rotates in the plane containing fixture axis 34, the locating feature 12 is mounted about center line 16, with lateral error (off center line 16) virtually eliminated other than bearing/bushing 68 dimensional tolerances. Operation of locator placement means 40 may be manual, by operator 10, upon receiving an indication that center line 16 of workpiece 14 is aligned with fixture axis 34. This indication may, for example, take the form of a green "go" light. Such an indication light may be responsive to sensor 38, and is of conventional design and within the ordinary skill of the art. Alternatively, locator placement means may be automatically operated through the use of a servo motor or the like (not illustrated) upon receipt of an indication (from, for example, sensor 38) that the center line 16 is substantially aligned with fixture axis 34.

Locator placement means 40 may be equipped with machined fore-aft stops (not illustrated) so that means 40 may be quickly and accurately moved, relative to support 32 and centering device 36, to accommodate varying length panels.

The advantages of an improved method and apparatus designed in accordance with this invention include the ability to ensure that the critical locating feature is positioned correctly on the workpiece (i.e., on the actual center line of the workpiece 14) 100% of the time, regardless of the varying width of the semi-rigid workpiece. Moreover, the stops included in fixture 30 permit handling of varying length workpieces. This invention thus provides the capability of accommodating varying width and length workpieces while producing a final product, that upon installation in a vehicle, will meet build objectives for best in class (i.e., centered about the vehicle center line) appearance.

The preceding description is exemplary rather than limiting in nature. A preferred embodiment of this invention has been disclosed to enable one skilled in the art to practice this invention. Variations and modifications are possible without departing from the purview and spirit of this invention; the scope of which is limited only by the appended claims.

What is claimed is:

1. An apparatus for mounting a locating feature on a semi-rigid workpiece, said apparatus having an axis and wherein the workpiece has a center line, comprising:

a support for receiving the workpiece;

a centering device proximate said support and having a pair of moveable centering members, said centering members being operative to move toward or away from each other such that each centering member maintains an equal distance from said axis, said centering device being operative to engage the workpiece with at least one of said centering members to thereby move the workpiece in a direction tending to align the center line with said axis;

a sensor for detecting when the center line is substantially aligned with said axis and causing said centering device to discontinue motion of said centering members; and, locator placement means for placing the locating feature onto the workpiece in a location about the center line wherein said centering device comprises a pair of racks, each of said racks having an elongated toothed portion in mesh with a toothed pinion wherein rotation of said pinion causes each rack to move an equal amount, each of said racks further having extending therefrom a respective one of said centering members.

2. The apparatus of claim 1 wherein said centering device further comprises a low pressure motor operatively coupled to said pinion.

3. The apparatus of claim 1 wherein said sensor comprises a first limit switch proximate one of said centering members to detect when the workpiece abuts said one centering member, said first limit switch being operative to cause said centering device to discontinue motion of said centering members when the workpiece abuts said one centering member.

4. The apparatus of claim 1 wherein said locator placement means comprises a locator arm moveable in a plane containing said axis, said locator placement means having a nest at one end of said locator arm, said nest having a recess sized to receive the locating feature.

5. The apparatus of claim 3 wherein said locator placement means has a first position wherein said locator arm is positioned for loading said nest with the locating feature, and a second position wherein said nest is positioned for placing the locating feature onto the workpiece in a location about the center line.

* * * * *